United States Patent
Chan et al.

(10) Patent No.: US 10,091,414 B2
(45) Date of Patent: Oct. 2, 2018

(54) METHODS AND SYSTEMS TO OBTAIN DESIRED SELF-PICTURES WITH AN IMAGE CAPTURE DEVICE

(71) Applicant: International Business Machines Corporation, Armonk, NY (US)

(72) Inventors: Yuk L. Chan, Rochester, NY (US); Heidi Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 15/192,125

(22) Filed: Jun. 24, 2016

(65) Prior Publication Data

US 2017/0374280 A1    Dec. 28, 2017

(51) Int. Cl.
*H04N 5/232* (2006.01)
*H04N 1/00* (2006.01)
(Continued)

(52) U.S. Cl.
CPC ......... *H04N 5/23222* (2013.01); *G06K 9/78* (2013.01); *H04N 1/00183* (2013.01);
(Continued)

(58) Field of Classification Search
CPC ......... H04N 5/23222; H04N 5/23293; H04N 5/232; H04N 5/23219; H04N 5/2621;
(Continued)

(56) References Cited

U.S. PATENT DOCUMENTS

| 5,266,985 A | * | 11/1993 | Takagi | ............... G03B 13/02 |
| | | | | 348/207.99 |
| 6,606,117 B1 | * | 8/2003 | Windle | ............... H04N 1/00183 |
| | | | | 348/222.1 |

(Continued)

FOREIGN PATENT DOCUMENTS

| CN | 103413270 A | 11/2013 |
| CN | 103491307 A | 1/2014 |

(Continued)

OTHER PUBLICATIONS

Technology Ace, [online]; [retrieved on Jun. 16, 2016]; retrieved from the Internet http://www.technologyace.com/technology/types-sensors-modern-smartphones/; Rowe, Martin, "Different Types of Sensors in the Modern Smartphones," 2013; 6 pages.

(Continued)

*Primary Examiner* — Michael Osinski
(74) *Attorney, Agent, or Firm* — Cantor Colburn LLP; William A. Kinnaman, Jr.

(57) ABSTRACT

Aspects relate to computer implemented methods and system to obtain self-pictures with an image capture device. The methods include receiving, by a processor, an input regarding a selected picture type to be captured, receiving, by an image sensor, a live image capture, identifying a subject in the live image capture, comparing the live image capture of the subject with a reference set based on the selected picture type, determining, based on the comparison, if the live image capture matches with the reference set, and providing feedback instructions regarding an adjustment to be made to improve matching between the live image capture and the reference set.

15 Claims, 3 Drawing Sheets

(51) Int. Cl.
*H04N 5/225* (2006.01)
*G06K 9/78* (2006.01)

(52) U.S. Cl.
CPC ..... *H04N 5/23216* (2013.01); *H04N 5/23219* (2013.01); *H04N 5/23293* (2013.01); *H04N 5/2259* (2013.01)

(58) Field of Classification Search
CPC .. H04N 5/23216; H04N 1/00183; G06K 9/78; G06K 9/00302; G06K 9/00597; G06K 9/00664
See application file for complete search history.

(56) References Cited

U.S. PATENT DOCUMENTS

| | | | | |
|---|---|---|---|---|
| 6,816,847 | B1* | 11/2004 | Toyama | G06K 9/00 382/156 |
| 7,239,350 | B2* | 7/2007 | Ban | H04N 5/23222 348/231.3 |
| 7,317,485 | B1* | 1/2008 | Miyake | G03B 17/20 348/333.02 |
| 7,327,890 | B2* | 2/2008 | Fredlund | G06K 9/3233 348/E5.047 |
| 7,417,672 | B2* | 8/2008 | Nakajima | G03B 17/24 348/207.99 |
| 7,432,973 | B2* | 10/2008 | Iga | H04N 5/232 348/239 |
| 7,532,235 | B2* | 5/2009 | Wang | H04N 5/232 348/207.99 |
| 7,973,848 | B2* | 7/2011 | Koh | G06K 9/00221 348/333.02 |
| 8,045,007 | B2* | 10/2011 | Gotohda | H04N 5/232 340/995.24 |
| 8,111,315 | B2* | 2/2012 | Uchida | G06K 9/00664 348/333.02 |
| 8,111,942 | B2* | 2/2012 | Farrer | G06K 9/00221 382/181 |
| 8,228,399 | B2* | 7/2012 | Hwang | H04N 5/232 348/231.99 |
| 8,379,999 | B2* | 2/2013 | Gabay | H04N 5/23222 358/3.26 |
| 8,417,054 | B2* | 4/2013 | Farrer | G06K 9/00221 382/274 |
| 8,477,993 | B2* | 7/2013 | Matsuura | H04N 5/232 382/103 |
| 8,508,622 | B1* | 8/2013 | Anon | H04N 5/23222 348/222.1 |
| 8,553,941 | B2* | 10/2013 | Gabay | H04N 5/23222 358/450 |
| 8,577,125 | B2* | 11/2013 | Shinoda | G06T 11/60 382/147 |
| 8,692,907 | B2* | 4/2014 | Arai | G06T 3/0012 348/222.1 |
| 9,036,943 | B1* | 5/2015 | Baldwin | G06K 9/00664 382/103 |
| 9,041,828 | B2* | 5/2015 | Kaneda | H04N 5/23219 348/222.1 |
| 9,060,129 | B2* | 6/2015 | Sakane | H04N 5/23293 |
| 9,143,677 | B1* | 9/2015 | Anon | H04N 5/23222 |
| 9,225,947 | B2* | 12/2015 | Lee | H04N 9/045 |
| 9,270,901 | B2* | 2/2016 | Iki | H04N 5/23293 |
| 9,385,324 | B2* | 7/2016 | Wu | H01L 51/006 |
| 9,420,169 | B2* | 8/2016 | Uemura | H04N 5/265 |
| 9,628,749 | B2* | 4/2017 | Donatelli | H04N 5/23293 |
| 9,635,249 | B2* | 4/2017 | Kimura | H04N 5/23222 |
| 9,667,860 | B2* | 5/2017 | Hakim | H04N 5/23222 |
| 2001/0048815 | A1* | 12/2001 | Nakajima | G03B 17/24 396/310 |
| 2005/0088542 | A1* | 4/2005 | Stavely | H04N 5/232 348/239 |
| 2006/0098104 | A1* | 5/2006 | Fujii | H04N 5/232 348/222.1 |
| 2006/0158534 | A1* | 7/2006 | Gotohda | H04N 5/232 348/239 |
| 2007/0147826 | A1* | 6/2007 | Matsuzaki | H04N 5/23293 396/287 |
| 2008/0239104 | A1* | 10/2008 | Koh | G06K 9/00221 348/240.99 |
| 2008/0309796 | A1* | 12/2008 | Abe | H04N 5/232 348/231.99 |
| 2009/0162042 | A1* | 6/2009 | Wexler | H04N 5/23222 396/49 |
| 2009/0196509 | A1* | 8/2009 | Farrer | G06K 9/00221 382/209 |
| 2009/0202137 | A1* | 8/2009 | Shinoda | G06T 11/60 382/145 |
| 2009/0231457 | A1* | 9/2009 | Lee | H04N 5/23219 348/222.1 |
| 2010/0302393 | A1* | 12/2010 | Olsson | G06K 9/00228 348/222.1 |
| 2011/0008036 | A1* | 1/2011 | Takatsuka | G03B 15/00 396/283 |
| 2011/0050915 | A1* | 3/2011 | Wang | H04N 5/232 348/207.99 |
| 2011/0216209 | A1 | 9/2011 | Fredlund et al. | |
| 2012/0075500 | A1* | 3/2012 | Kaneda | H04N 5/23219 348/231.6 |
| 2012/0182447 | A1* | 7/2012 | Gabay | H04N 5/23222 348/231.6 |
| 2012/0242849 | A1* | 9/2012 | Herz | H04N 5/23222 348/208.99 |
| 2013/0021487 | A1* | 1/2013 | Ishino | H04N 5/23222 348/220.1 |
| 2013/0128090 | A1* | 5/2013 | Choi | H04N 5/23222 348/333.02 |
| 2013/0155280 | A1* | 6/2013 | Donatelli | H04N 5/23293 348/231.99 |
| 2013/0293579 | A1* | 11/2013 | Wu | H01L 51/006 345/633 |
| 2014/0184829 | A1 | 7/2014 | Li | |
| 2014/0247325 | A1 | 9/2014 | Wu et al. | |
| 2015/0229838 | A1* | 8/2015 | Hakim | H04N 5/23222 348/333.02 |
| 2015/0268822 | A1* | 9/2015 | Waggoner | G06F 3/0482 715/722 |
| 2016/0080643 | A1* | 3/2016 | Kimura | H04N 5/23206 348/207.1 |
| 2016/0284095 | A1* | 9/2016 | Chalom | H04N 5/23229 |
| 2017/0034409 | A1* | 2/2017 | Chen | H04N 5/23222 |
| 2017/0208246 | A1* | 7/2017 | Kimura | H04N 5/23222 |
| 2017/0244891 | A1* | 8/2017 | Liu | H04N 5/23219 |

FOREIGN PATENT DOCUMENTS

JP 2008118276 A 5/2008
JP 2011250131 A 12/2011

OTHER PUBLICATIONS

University of California San Diego School of Engineering, [online]; [retrieved on Jun. 21, 2016]; retrieved from the Internet http://vision.ucsd.edu/content/yale-face-database "Yale Face Database", UCSD Computer Vision, 2001; 1 page.

* cited by examiner

FIG. 3
Reference A
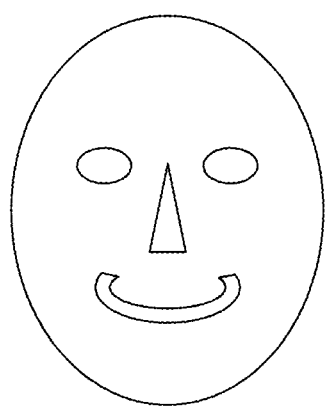
Reference B
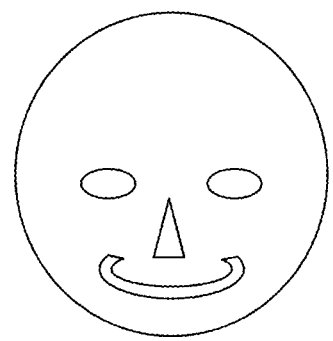
Reference C
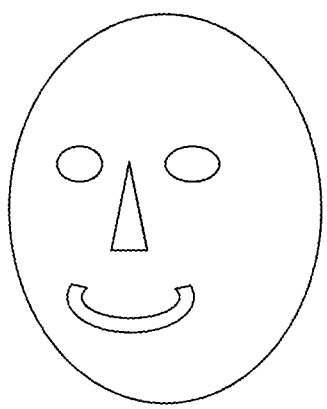
Reference D
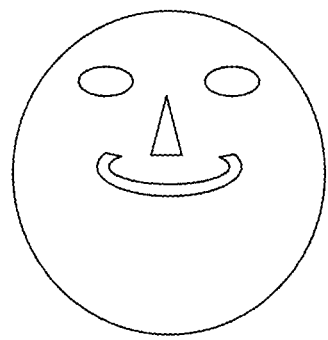

METHODS AND SYSTEMS TO OBTAIN DESIRED SELF-PICTURES WITH AN IMAGE CAPTURE DEVICE

BACKGROUND

The present disclosure relates generally to image capture systems and processes and, more specifically, to systems and processes for obtaining self-pictures.

Consumers and other persons ("user(s)") may wish to take a picture of his or herself to capture a unique background or an event. Taking self-pictures has always been popular with a camera 'auto' mode where a user would try to adjust a camera angle and then be part of a 'timed' or delayed picture capture or photograph. Such 'auto' modes can be used for with handheld cameras and/or other consumer devices (e.g., cell phones, tablets, laptop computers, etc. that include a camera).

For example, taking self-pictures has become popular with the advent of cell phone and social networking (i.e., for quickly sharing such images) and has been termed as 'taking a selfie.' Although popular, the nature of self-pictures may result in (1) not capturing entire desired background, (2) someone could be distracted to look away from the camera just before the picture is taken (especially when capturing multiple individuals), (3) a user's eyes may not look relaxed or the user may not capture him or herself at the best angle, etc. In view of the above, it may be desirable to have improved modes for camera operation for self-picture capture.

SUMMARY

According to embodiments, methods, systems, and computer program products are provided for obtaining self-pictures with an image capture device are provided. Various embodiments include receiving, by a processor, an input regarding a selected picture type to be captured, receiving, by an image sensor, a live image capture, and identifying a subject in the live image capture. Embodiments further include comparing the live image capture of the subject with a reference set based on the selected picture type, determining, based on the comparison, if the live image capture matches with the reference set, and providing feedback instructions regarding an adjustment to be made to improve matching between the live image capture and the reference set.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is an illustration of a reference set of images in accordance with an embodiment of the present disclosure.

DETAILED DESCRIPTION

Figure 1:
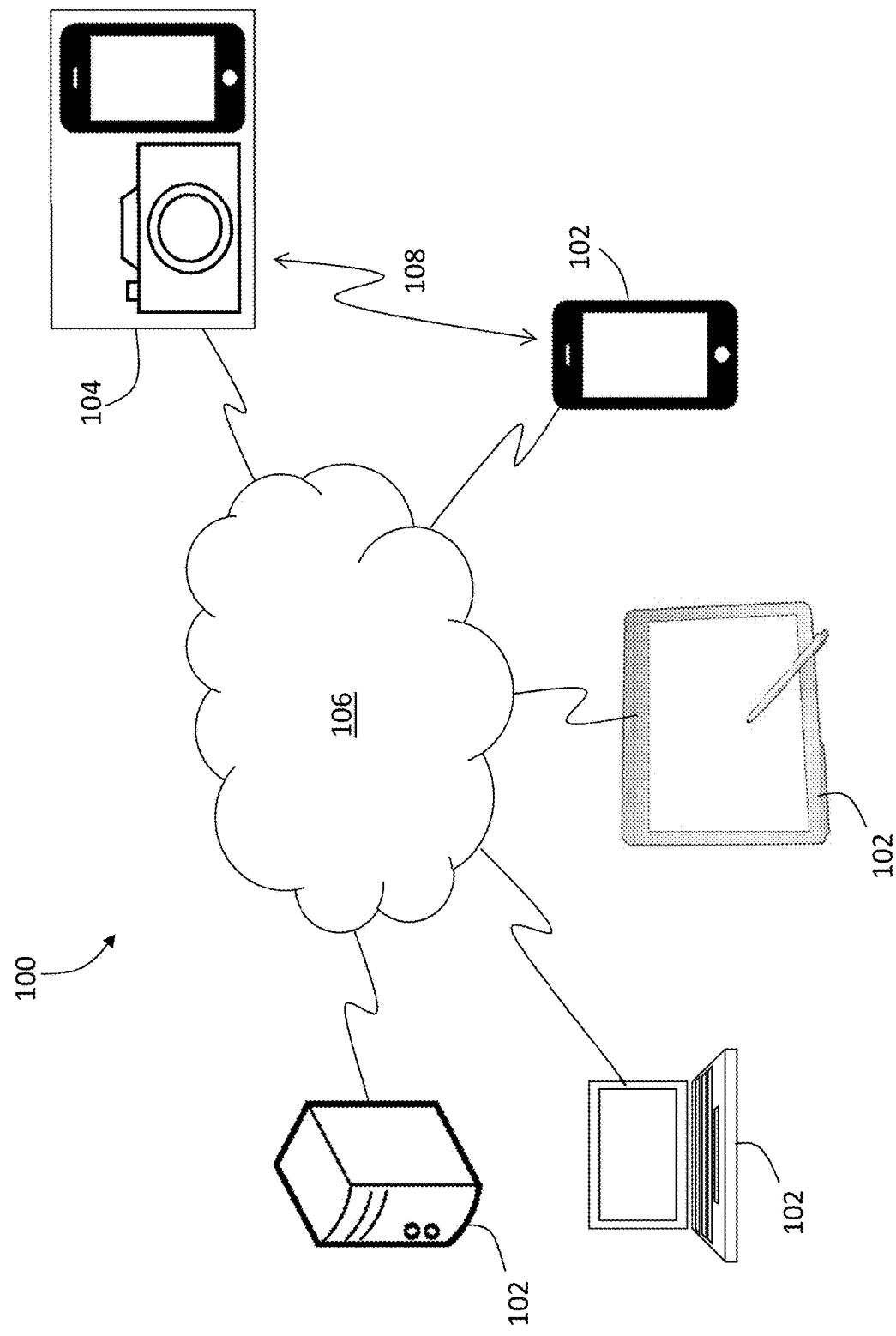
FIG. 1 depicts a block diagram of a system for enabling image capture device functionality in accordance with an embodiment of the present disclosure.

As noted above, consumers and other persons ("user(s)") may wish to take a picture of his or herself (alone or with other persons) to capture a unique background, event, etc. Taking self-pictures has always been popular with a camera 'auto' mode where a user would try to adjust a camera angle and then be part of a 'timed' or delayed picture capture or photograph. Such 'auto' modes can be used for with handheld cameras and/or other consumer devices (e.g., cell phones, tablets, laptop computers, etc. that include a camera).

For example, taking self-pictures has become popular with the advent of cell phone and social networking (i.e., for quickly sharing such images) and has been termed as 'taking a selfie.' Although popular, the nature of self-pictures may result in (1) not capturing entire desired background, (2) someone could be distracted to look away from the camera just before the picture is taken (especially when capturing multiple individuals), (3) a user's eyes may not look relaxed or the user may not capture him or herself at the best angle, etc. In view of the above, it may be desirable to have improved modes for camera operation for self-picture capture.

Accordingly, embodiments described herein are directed to camera operation modes that provide improved camera operation for the capture of self-pictures. For example, embodiments provided herein include capture modes that enable detection of all intended objects (e.g., users, faces, etc.) with everyone in the picture with open eyes and/or smiling and indication that the subjects (i.e., the people being captured in the picture) should maintain smiling and keep their eyes open. Further, embodiments provided herein are directed to having a camera mode in which the camera provides directions and/or indications to one or more subjects in order to capture a desired picture. Further, embodiments provided herein are directed to camera modes of operation that can detect a user's current expression and compare such expression to a reference image or data set such that the camera can indicate to a user to adjust their position, stance, face, eyes, etc. such that an ideal or best self-picture can be captured.

Generally speaking, in accordance with a non-limiting embodiment of the present disclosure, a user selects a type of self-picture the user is about to capture. The type of self-picture can include emotions (e.g., sad, normal, funny, surprised, etc.) as well as an indication of multiple subjects to be captured, etc. In accordance with some embodiments, an indication of the type of self-picture can enable the camera system to select a sample baseline image(s) that is to be compared to the captured image. Feedback can then be provided to the user in real time to improve the user's picture using various techniques (e.g., light or sound indicators). The feedback component of the camera system can be configured to continually learn about the user by updating the sample images of the user rather than always relying on generic images. Further, the camera system, in accordance with some embodiments, can record the height, distance, and angle at which the camera captures images of certain types to capture the user's most flattering poses. In addition, embodiments provided herein can aid in taking selfies that do not truncate people or the background that is attempted to be captured. In some non-limiting embodiments, the images to be used as samples for comparison by the camera system can be selected automatically by mining the data from social networks, cloud-based services, shared databases and/or datasets, user-provided input, etc.

Referring to FIG. 1, a block diagram of a system 100 for using an image capture device pertaining to a discussion in accordance with an embodiment is shown. The system 100 includes an image capture device 104 for performing the image capture, processing, and/or enabling the functions and functionality described herein. For example, the image capture device 104 can be a digital camera, a smart phone, personal tablet, laptop computer, or other personal electronic device that includes image captures software and hardware and/or data processing and transmitting software and hardware.

For example, the image capture device 104 can be configured to execute by one or more computer programs located on the image capture device 104 and/or located on one or more remote resources 102 through communication therewith. As shown, the image capture device 104 is a camera, although other personal electronic devices may employ embodiments described herein, as described above (e.g., smart phone, cell phone with a camera, etc.). As shown, the system 100 may incorporate one or more remote resources 102, such as a laptop, a smartphone, a tablet, and/or a remote server or storage device (e.g., cloud-based storage) although other remote resources such as personal electronic devices or internet based sources may be used with systems and processes described herein.

The system 100 depicted in FIG. 1 includes one or more remote resources 102 which a user can access from the image capture device 104 to initiate, interact with, and/or receive information therefrom. In some embodiments, the image capture device 104 can automatically access the remote resources 102 during processing and operation as described herein. As shown, the remote resources 102 are coupled to the image capture device 104 via a network 106. Some of the remote resources 102 may be implemented using general-purpose computers executing computer programs for carrying out various processes and/or programs. The devices of the remote resources 102 may be user devices such as personal computers (e.g., laptops, tablet computers, cellular telephones, etc.). In some embodiments, such as if the remote resources 102 are personal computers or smartphones, the processing described herein may be shared by one or more remote resources 102 and the image capture device 104. The remote resources 102 may also include game consoles, network management devices, field programmable gate arrays, etc.

The network 106 may be any type of known network including, but not limited to, a wide area network (WAN), a local area network (LAN), a global network (e.g. Internet), a virtual private network (VPN), a cloud network, and an intranet. The network 106 may be implemented using a wireless network or any kind of physical network implementation known in the art. A remote resource 102 may be coupled to the image capture device 104 through multiple networks 106 (e.g., cellular and Internet) so that not all remote resources 102 are coupled to the image capture device 104 through the same aspect of network 106. One or more of the remote resources 102 and the image capture device 104 may be connected to the network 106 in a wireless fashion. In one non-limiting embodiment, the network is the Internet and one or more remote resources 102 and/or the image capture device 104 execute a user interface application (e.g. a web browser or app) to communicate to each other through the network 106.

In another non-limiting example embodiment, the remote resource 102 may be connected directly (i.e., not through the network 106) to the image capture device 104. That is, as shown, a direct or dedicated communication link 108 may be formed between the image capture device 104 and the remote resource 102 (e.g., a smartphone). Such connection may be made by Bluetooth® connection or other near-field communication protocol.

In some embodiments, the image capture device 104 may be configured to access one or more programs, applications, and/or software that are accessible in the cloud, e.g., stored on one or more internet based servers. As such, a storage device or remote server may be implemented as one of the remote resources 102 using a variety of devices for storing electronic information. In an example embodiment, data stored in the storage device or remote server may include, but is not limited to, one or more user applications and/or data, including but not limited to, historical images, social media images, metadata related to the same, etc., and other data utilized by embodiments described herein. It is understood that the remote server or storage device may be implemented using memory contained on a remote resource 102 or that it may be a separate physical device, e.g., an internet server with cloud storage. The storage device remote resource 102 may be logically addressable as a consolidated data source across a distributed environment that includes the network 106. Information stored in the storage device may be retrieved and manipulated via the image capture device 104 and/or via another remote resource 102, e.g. a laptop or smartphone.

The image capture device 104 may be based on a modular concept designed to include a motherboard or base card of minimum card size that may be configured for enabling various functions. For example, a base card of the image capture device 104 may be implemented in a basic shell providing desktop-like functionality via a touchscreen display, a communications interface (e.g., GPS and cellular communications capability), or other features that may be provided within the base card. The image capture device 104 may be provided with a processor or controller, memory, and various other electronic components configured to enable image capture, feedback actions, processing, etc. on the image capture device 104 to enable a user to interact with programs and applications stored on the image capture device 104 and/or to communicate and interact with one or more programs and applications stored on the one or more remote resources 102.

The image capture device 104, in some embodiments, may execute one or more computer programs, e.g., an image capture application, to provide aspects of embodiments as described herein. Processing may be shared by the image capture device 104 and one or more of the remote resources 102. Alternatively, the image capture device 104 can include stand-alone software application(s) for performing a portion or all of the processing described herein. As previously described, it is understood that separate servers may be utilized to implement network server functions and application server functions. Alternatively, a network server, a firewall, and an application server may be implemented by a single server executing computer programs to perform the requisite functions.

In accordance with embodiments described herein, a user may use an image capture device 104 to capture self-pictures including one or more subjects with the captured images including ideal or preferred images of the subjects that are captured. Further, users may use the image capture device 104 to prompt the user or other subjects to change position, angle, or take other action in response to an instruction from the image capture device 104 (or from a remote resource 102).

When taking a picture using image capture device 104, the image capture device 104 can be configured to provide the user with an option to select the type of picture the user wants to capture. The options for the type of image can include, but are not limited to weird, normal, surprised, angry, funny, etc. For example, a "normal" type picture may mean eyes looking straight at the camera, eyebrows not raised, and lips curled into a smile. On the other hand, a surprised picture may mean eyes wide open, eyebrows raised, and mouth wide open. These characteristic (e.g., facial features, etc.) can be used as a baseline in guiding the user to obtain a "best" image of the selected picture type. Based on the selected picture type, and the baseline, the image capture device 104 (or another device) can provide feedback and/or instructions to the subjects being captured in order for the "best" image of the selected picture type to be captured.

A used herein, the baseline can be used as a reference set of data to which a current image is compared to ensure a specific picture type is being captured. For example, the baseline can include generic information (e.g., data set applicable to all users) or can incorporate user-specific information.

In a generic information configuration, the baseline can be based on a set of generic images of a particular picture type or can be based on one or more data sets related to the picture time. For example, in the former configuration, the baseline can be based on a dataset that is based on a plurality of images that are previously designated as a particular picture type. In one non-limiting example, such a data set can be a database based on publically available images that are described, labeled, or otherwise marked as capturing the picture type (e.g., generic facial images of people smiling for a "happy" picture type). Other generic information can include purely data-based information such as measuring or comparing exposure of teeth, squinting of eyes, etc. to determine if a present image is within the definition or type of selected picture type.

In a user-specific information configuration, the baseline can be based on one or more images of the user that have been labeled, characteristics, or otherwise marked as capturing a specific picture type. For example, a user can take a self-picture or use pictures captured by other people and specifically label these images into various picture types.

In some embodiments, a combination of generic information and user-specific information can be used in accordance with embodiments of the present disclosure. Further, the generic (e.g., standard) image types could be set of generic sample images which are part of a learning dataset. Accordingly, as the image capture device 104 is used to capture specific picture types, the image capture device 104 can update the reference set to include currently captured images of the indicated picture type. In this manner, systems of the present disclosure can be configured to improve and learn over time, as a user uses the image capture device 104 to capture picture types.

In such an example, over time, the initially generic images can be supplemented or even replaced by the user's own images as part of the learning process. Such configuration can provide customized guidance to the particular user in capturing images of similar picture types.

In one non-limiting example of the present disclosure, an image capture system (e.g., system 100) can be configured to guide the user (e.g., one or more subjects) to capture a desired picture type. The picture type desired will decide on how the system will guide the user. Guiding may be done using animated markers, lights, audio, voice, hologram technologies, etc. For example, an animated image visible to the user while attempting to capture a self-picture, such as a dot, could guide the user/users where to look at while the desired image is being captured. In one example of such a configuration, the dot can be superimposed on top of a display screen so that the users viewing the display screen can see the instruction dot and look accordingly. Thus for a normal image, the user may be helped to look straight at the camera rather than attempt to look toward the image capture device with droopy eyes.

During image capture (e.g., while a user is holding the image capture device to take a picture) or after an image is captured using the guiding process, an image processing software query will run on the yet to be stored image in real time. Such image processing query could be run on the image capture device 104 and/or on a remote resource 102 (e.g., shared processing is enabled with various embodiments of the present disclosure). The system 100 can also store and continuously update the repository of the reference set of the user by type to be used for comparison against the yet to be stored image in real time.

The image processing query will compare a current image obtained by the image capture device with one or more reference images (hereinafter "the reference set"). The process is an automated, digital processing of the current image (which can be a live image obtained by the image capture device, i.e., not a captured picture). The comparison between the reference set (e.g., reference images) and the current image is a comparison of one or more characteristics. The characteristics can include facial matching, positions matching, etc. If the current image does not match the reference set (within a predetermined threshold) then feedback is presented in real time to the user to adjust the camera and/or adjust some aspect of the subjects being captured. The feedback can include but is not limited to voice instruction, animated markers, and holograms. The user may be asked to correct a characteristic of the image (e.g., a position, facial expression, etc.) until the current image matches the reference set within a threshold. Once the threshold match is met, the image capture device can capture the desired image and can store the captured image. Further, in some embodiments, the system can tag or otherwise mark the captured image as a data point for the specific picture type, thus improving the learning of the system and/or improving the reference set.

When the image of a particular picture type is being captured, the height, distance, and the angle of the image capture device capturing the image(s) may be monitored and stored. For example, various sensors in cell phone or other image capture devices can include gyroscopes, accelerometers, proximity sensors, etc. which may be used to monitor and record various device characteristics during and when an image is captured.

If the user likes the captured image, the system can save the image or image data related thereto into the reference set. A "like" by the user may be indicated by the user's actions, such as sharing the captured images on social networks, setting the image as the user's profile picture on a social site, emailing the image to others, etc. and/or gets multiple likes for a picture on social network or receives similar input from external persons (e.g., "social network criteria"). The stored captured images can be incorporated into the reference set. As such, a currently captured image may be used in the future to guide the user to capture more such images in the selected category. This may be especially useful in capturing single person 'selfies' or self-pictures. The "good" results of a captured image may be reproduced by assisting the user to take more similar pictures by prompting the user to achieve the same angles, distances, etc. that are most flattering to the user.

Figure 2:
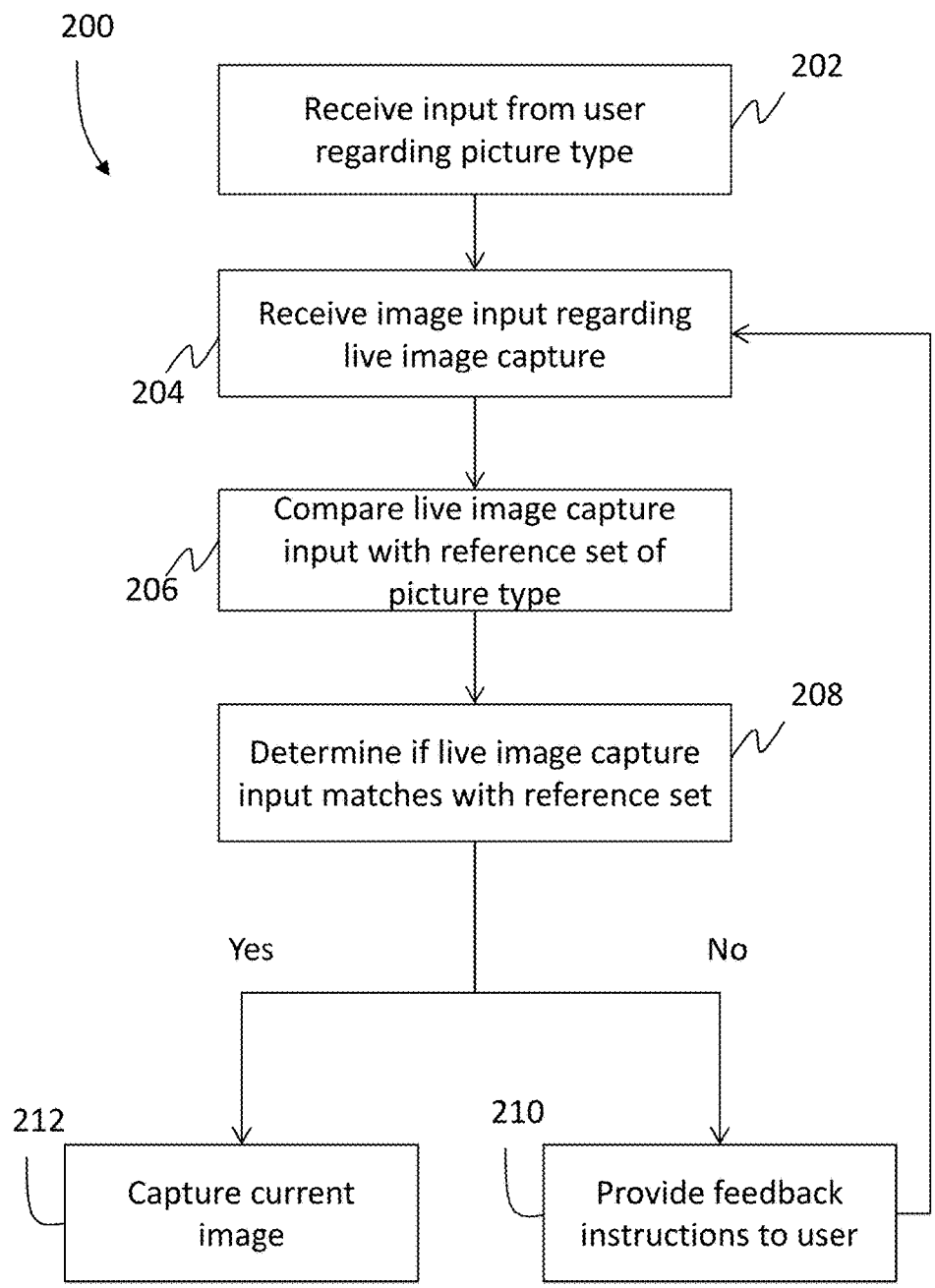
FIG. 2 is a flow process for capturing a self-image in accordance with an embodiment of the present disclosure.

For example, turning to FIG. 2, a flow process in accordance with an embodiment of the present disclosure is shown. The flow process 200 can be performed by an image capture device or in connection with remote resources (e.g., as shown in FIG. 1). The image capture device can include a camera, processing components, memory/storage components, etc. as described above. The flow process 200 is a method of operating an image capture device such that a desired picture type can be captured. The flow process 200 is configured to be used to capture self-pictures (e.g., selfies, or images wherein a user is holding an image capture device and pointing such device at him or herself).

At block 202, an image capture device receives input from a user regarding a picture type to be captured. The input may be provided by touchscreen input, keyboard input, adjusting a dial, etc., on the image capture device or by selecting such a picture type using a remote resource that is in communication with the image capture device. In some embodiments, the input may be provided by audio inputs, such as a user speaking into a microphone that can process the input from the user. Other types of user inputs can be employed without departing from the scope of the present disclosure.

At block 204, the image capture device will receive live image capture through a lens or other optical capture device (e.g., a camera). In some embodiments, the live image capture can be an active and real time optical input to image sensors of the image capture device. In other embodiments, the image capture device can obtain an initial image or picture after the picture type is selected by the user. As used herein, the initial image or picture will be referred to and encompassed within the term "live image" or "live image capture."

At block 206, the live image capture obtained at block 204 is compared with a reference set. The reference set is a data set that is representative of the selected picture type. As noted above, the reference set can be information or data that is stored on the image capture device, can be information or data that is stored on a remote resource or a combination of the two. If the reference set is stored on the image capture device, the comparison between the live image capture and the reference set can be performed with a processor and memory of the image capture device. If the reference set is stored on a remote resource, the reference set that is particular to the picture type can be communicated to the image capture device for processing on the image capture device or the live image capture can be transmitted to a remote resource for the comparison to occur.

The reference set, as described above, is a data set or information that is associated with various picture types. The reference set can include generic data, as described above, or can be learned and tailored to a specific user.

The comparison at block 206 can involve various image comparison techniques or combinations thereof. For example, in some embodiments, the comparison can involve comparing ratios, lighting values, etc. that are components or features of the live image capture and the reference set. In further embodiments, the comparison can involve matching one image to another (e.g., facial overlays comparing a live image capture face with a reference set face). Those of skill in the art will appreciate that other techniques and/or combinations of techniques can be used to compare the live image capture with the reference set.

Based on the comparison of block 206, the system is configured to determine if the live image capture matches with the reference set, as shown at block 208. The determination can be based on a threshold. For example, the system can be configured to determine that a match is made if the live image capture matches with the reference set above a percentage match or other threshold criteria. That is, because of the nature of taking pictures is so variable (e.g., lighting, clothing, make-up, the number of people, background, etc.) a threshold may be set, for example in one non-limiting embodiment, at about 65% match between the live image capture and the reference set. Various other criteria can be used when comparing the live image capture and the reference set, as known in the art.

As shown in flow process 200, a decision tree is made wherein the live image capture and the reference set are reduced to a "yes" or "no." In this decision tree, based on the criteria of the comparison at block 208, the system can output a yes or no based on the comparison and either continues to block 210 ("no") or block 212 ("yes").

If it is determined at block 208 that the live image capture fails to meet the match criteria (e.g., exceed a threshold percentage, etc.) the flow process 200 continues to block 210. At block 210, feedback instructions are provided to the user so that an adjustment can be made in order to improve the matching between the live image capture and the reference set. For example, feedback instructions can include, but are not limited to, displaying directional arrows on a display of the image capture device to move the image capture device, providing auditory instructions (e.g., "hold camera higher," "tilt head back 5 degrees," "turn body slightly right," etc.), or other instructions. In some embodiments, the image capture device can display a hologram image for the user to refer to and make appropriate adjustments. Other instructions can include adjustment of lighting, changing facial expressions, etc. Those of skill in the art will appreciate that feedback instructions can be related to moving and/or adjusting the image capture device and to instructions to adjust the user or some other aspect of the image to be captured.

In some embodiments, the feedback instructions can be provided from or on the image capture device (e.g., on a screen of a smart phone, etc.). However, in other embodiments, the feedback instructions can be sent from the device that processed the images and made the comparison (e.g., the image capture device or a remote resource) to another device. In one non-limiting example, if the image capture device determines that an adjustment is necessary (e.g., "no" after block 208), then the image capture can transmit an instruction to a remote resource, such as a device on the user's person (e.g., another phone, portable electronic device, etc.). The remote resource can then provide a prompt or instruction to the user to make the appropriate adjustment. In some embodiments, the device used to process the comparison can be configured to selectively instruct or transmit to one or more other device (e.g., image capture device, remote resource, etc.).

The flow process 200 will then return to block 204 to receive live image capture and again compare against the reference set (e.g., blocks 204-208).

When a determination of "yes" is made after block 208, the flow process 200 continues to block 212. At block 212, an image is captured by the image capture device. That is, once it is determined that the current live image capture matches the reference set sufficiently, a final image in agreement with the reference set of the selected picture type is captured and saved. The saving of the final image can be made within the image capture device or can be communicated to a remote resource for saving.

Accordingly, the flow process 200 can be used with an image capture device to capture a specific and desired picture type. As noted above, the reference set can be based on the selected picture type. As such, a user can capture an image that is of the desired type. Further, the instructions (e.g., feedback) can be used to instruct the user to make adjustments such that the most flattering or best image of the selected picture type can be obtained.

The above described process and devices can also be used to capture an image of multiple subjects (e.g., people). For example, if a user intends to capture multiple subjects (e.g., people) in a single image, the image capturing device (or remote resources) can be configured to detect each person in the live image capture. With each person detected, the process can further include identifying each person through image recognition and looking up the user's friends list. With each person identified in an image, each person's favorite and flattering angle/side while taking a picture can be determined by pulling each person's individual profile information. That is, the flow process 200 can further include a step of identifying the subjects of the current live image capture and then obtain a reference set for each subject.

For example, a first subject in a live image capture can have a first reference set that is specific to the first subject and a second subject in an image in the live image capture can have a second reference set that is specific to the second subject. In such an example, blocks 204-210 of flow process 200 can be provided for each subject of the live image capture, and thus feedback can be provided to each of the subjects to obtain the best image of a desired picture type. For example, a first subject may prefer to face slightly to the right when posing for a picture. On the other hand, the second subject may try to face left. During the image comparison with the reference sets of each subject, the feedback instructions can include instructions to each subject to obtain a desired image. Further, for example, the feedback instructions can obtain other information from the reference set or pre-stored information to make further recommendations. For example, in images with multiple people, the height of the subjects may be a factor in how the image looks. Accordingly, in one non-limiting embodiment, the image capture device can receive a reference set for each subject and take the heights of people into account. From this, the feedback instructions may include instructions for the subjects to stand or position themselves in a lineup for a picture. Furthermore, in some embodiments, because the reference sets are available and considered for providing feedback instruction, recommendations to each user regarding the position of the head with respect to the body, etc. can be provided.

Further, in some embodiments, if the live image capture includes multiple subjects, the system can be configured to make a comparison of the facial features of each subject with respect to a reference set. The reference set, in some embodiments, can be specific to each particular subject. However, in some embodiments, a subject may not have a personalized reference set, and thus, this subject can be provided feedback instructions based on a generic reference set for the selected picture type. Moreover, in addition to making a check on each person that is being captured, the system can be further configured to make sure that the image captures each subject/person fully. Thus, for people captured at each end of a line of subjects, the comparison step (e.g., block 208) can make sure that the entire contour of the face of each subject is being captured within the live image capture and ensuring that no portion of a subject's face is out of a frame of the image. Accordingly, even if each subject's face is appropriate to match the reference sets, a determination of "no" at block 208 can be made if a subject's face is partially obscured or otherwise not in the frame. In such situations, the feedback instructions may be only related to adjustments to either the image capture device angle/position and/or the subject to move and no other instructions may be made. In some embodiments, a holographic feedback system may be useful to obtain accurate and efficient adjustment of the subjects and/or the image capture device.

Furthermore, in some embodiments, in either case, when the image is of a single person or multiple people, image processing can quickly determine if the live image capture is trying to capture a landmark such as a tower or a temple in the background. In such an embodiment, the comparison step (e.g., block 206) can determine if part of the background is being truncated or otherwise obscured. If a determination is made that the landmark is obscured, the system can guide the user(s) to move or change the focal length to capture the entire background within the feedback instructions.

In some embodiments, a single subject or each subject of multiple subjects in a live image capture can be automatically identified. That is, in some embodiments, the system can be configured to make image comparisons to identify specific individuals. Whether identified automatically or input by a user, sample images (e.g., reference set) for a type of self-picture can then be referenced for each identified subject.

Based on the reference sets for each subject, the feedback provided can be in terms of instructing one or more subjects to turn, look a certain way, swap position (e.g., based on trying to capture each person's flattering angles, people's height that looks good for lineup, etc.) and/or moving the image capture device (e.g., for capturing an entire background). That is, embodiments provided herein can guide one or more subjects with a combination technique to adjust the subject's orientation in the image (e.g., face, angle, etc.) and to adjust an image capture device to match a "most desirable pose" for one or more subjects. Guiding the subject(s) to reposition can be especially important in group pictures because the image capture device cannot be adjusted to satisfy requirements from multiple users. Thus, for example, in group pictures, the feedback instructions can suggest a line-up based on subjects' heights as well as their flattering angles.

Turning now to FIG. 3, various illustrations of a reference set are shown. Each image in the reference set of FIG. 3 can be an image of a subject making a happy face. Each of the images can be labeled, as shown, as Reference A, Reference B, Reference C, and Reference D. The image of Reference A is a face-forward image, with no tilt or turn with respect to an image capturing device.

Reference B is a second image of a happy face, but with the face rotated downward relative to Reference A. The rotation or tilt of a subject's head can be measured and detected by the image capturing device, for example, because distances between the eyes, nose, and mouth are reduced from this angle. Further, as illustrated, a face height can be reduced as compared to Reference A. Additionally, the eyes, nose, and mouth may all be located in a lower portion of the face or head of the subject.

Similarly, Reference C is an illustration of the subject's face rotated to the right, relative to Reference A. In this case, the image capturing device may detect the rotation through a reduced distance between eyes, a change in prominence of the nose, and/or a change in the length of the mouth. Reference D is an illustration of the subject's face tilted or rotated upward. Similar to Reference B (as compared to Reference A), the image of Reference D will have reduced distance between eyes, nose, and mouth, a reduced face height, and a shift in the location of the eyes, nose, and mouth (e.g., upward on the face or head as compared to Reference A).

In some embodiments, each of Reference A-D shown in FIG. 3 can represent an image of a reference set. In some embodiments, analytics can be performed to determine a preference for one of the images Reference A-D. For example, the system can be configured to access social networks of a user to analyze images in which the subject is tagged. With a collection of tagged images, the system can analyze which of the Reference images is most popular or most highly represented or prevalent in the stored, social network images. If a single facial position is most popular, that single facial position can be set as the reference set—or each and all of the images of the particular single facial position can be used within the reference set.

In one non-limiting example, a baseline or the 'normal' picture (e.g., Reference A) can be used to compare measurements of the distance between facial features of a subject in order to make recommendations for a picture. In this non-limiting example, we will refer to Reference A as the normal picture. A user's most liked picture(s) or ones used to setup as profile pictures on social networks can be matched with respect to the baseline (Reference A), with each of the most liked images defined as Reference B, Reference C, or Reference D. As noted, Reference B is the user's face rotated downwards or a chin down angle. Reference C is the user's face rotated to a right angle. Reference D is the user's face rotated up or a chin up angle. Based on the matches, if the system determines, through analytics, that a person's most flattering angle is Reference C (i.e., with the user's face slightly rotated right) or Reference A (i.e., front facing), the image capture device could be guided to be adjusted so as to capture these most flattering angle. Alternatively, as noted above, the person could be guided to rotate his/her face so as to capture his/her most flattering angle(s). In either case, such guiding is provided as the feedback instructions described above.

In some embodiments, the system can allow for continuous shots in order to allow multiple choices for the user after the shots are taken. In such a configuration, the image capture device can provide feedback instruction to have the user make adjustments. Further, the system, when presenting the images from the continuous shots can recommend which one of the series of shots may be the closest to the user's typical or preferred favorite picture/position. Accordingly, systems as provided herein can tag or otherwise mark images indicating that the marked image captures a preferred picture type and/or is the best of a series of images that are marked as capturing a specific picture type.

In still further embodiments, the image capture device can be configured on a movable device, such as a drone, a flying camera, a camera mounted on an autonomous vehicle or device, etc. In such embodiments, the feedback instructions can take the form of commands that are executed by the autonomous vehicle image capture device. That is, if the live image capture determines that moving the image capture device will obtain a better match of the live image capture with the reference set, the feedback instructions can include commands to autonomously move the image capture device in an appropriate manner. In some embodiments, such a configuration may also include feedback instructions supplied to the user(s) and/or subject(s) as described above.

For example, in one non-limiting embodiment, an image capture device can be attached to, mounted on, or otherwise connected to a flying drone. A user can select a picture type on the image capture device, and then the flying drone can move away from the user. The flow process described above can then be carried out entirely autonomously and automatically, with the flying drone being instructed through the feedback instructions to move to an ideal position relative to the user to capture the desired picture type. In some embodiments, the image capture device may provide additional feedback instructions directly to the user, such as auditory or visual instructions. In one such embodiment, an instruction may include changing an order of multiple people standing next to each other or having one or more user(s) or subject(s) adjust a tilt of their head in order to capture each individual within a group image at their best or ideal angle.

Technical effects and benefits include systems and processes for obtaining ideal or best self-pictures through feedback instructions provided to a user. Further technical effects include learning of the system to learn the best image angle and/or other characteristics of an image such that feedback instructions can be provided to a user to enable best self-pictures. Further technical effects include comparing a live image capture with a reference set such that the system can make determinations and recommends to be provided to a user such that an adjustment can be made to improve in image to capture a specific picture type, as desired by a user.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method to obtain self-pictures via a system comprising a processor, memory, and an autonomous vehicle that includes an image capture device having at least one image sensor, the method comprising:

receiving, by the processor, an input regarding a selected picture type to be captured, wherein the picture type is selected from a plurality of preset picture types, wherein the plurality of preset picture types includes at least one of a happy picture type, a surprised picture type, or a funny picture type;

receiving, by the image sensor, a live image capture, wherein the image capture device is configured to monitor and store a height, distance, or angle of the image capture device at a time when the image capture device is capturing the live image capture;

identifying, by the processor, a person in the live image capture;

mining, by the processor, images of the person from one or more social networks based on social network criteria;

comparing, by the processor, the live image capture of the person with a reference set based on the selected picture type, wherein the reference set comprises a set of historical images of the person, wherein the set of historical images of the person includes at least one or more previously captured images of the selected picture type that are obtained by the mining, wherein the comparing includes comparing the live image capture of the person with the set of historical images of the person;

determining, by the processor, based on the comparison, when the live image capture matches with the reference set, wherein the matching is based at least in part on one or more of the stored height, distance, or angle of the image capture device;

upon determining that the live image capture does not match the reference set, providing feedback instructions regarding an adjustment to be made to improve matching between the live image capture and the reference set, wherein the live image capture is not stored by the processor, wherein providing feedback instructions includes issuing control commands by the processor upon determining that the live image capture does not match the reference set, wherein the control commands when executed by the autonomous vehicle cause the autonomous vehicle to move to a new position relative to the person based on the adjustment; and upon determining that the live image capture matches the reference set, capturing a current image by the image sensor and storing the captured current image by the processor.

2. The computer implemented method of claim 1, wherein the feedback instructions include at least one of visual instructions or audible instructions.

3. The computer implemented method of claim 1, wherein the reference set further comprises a generic set of images of the selected picture type.

4. The computer implemented method of claim 1, wherein the live image capture includes at least one of a plurality of captured still images or a live image feed obtained through the image sensor.

5. The computer implemented method of claim 1, wherein determining a match between the live image capture and the reference set comprises determining if a threshold is met or exceeded when the comparison is made.

6. The computer implemented method of claim 1, further comprising determining a plurality of people are present in the live capture, wherein each of the plurality of people is identified in the live image capture, wherein a reference set for each person is compared, and the feedback instructions include instructions associated with each of the plurality of people.

7. A system to obtain self-pictures comprising:
an autonomous vehicle that includes an image capture device having at least one image sensor;
a memory having computer readable instructions; and
a processor configured to execute the computer readable instructions, the computer readable instructions comprising:

receiving, by the processor, an input regarding a selected picture type to be captured, wherein the picture type is selected from a plurality of preset picture types, wherein the plurality of preset picture types includes at least one of a happy picture type, a surprised picture type, or a funny picture type;

receiving, by the image sensor, a live image capture, wherein the image capture device is configured to monitor and store a height, distance, and angle of the image capture device at a time when the image capture device is capturing the live image capture;

identifying, by the processor, a person in the live image capture;

mining, by the processor, images of the person from one or more social networks based on social network criteria;

comparing, by the processor, the live image capture of the person with a reference set based on the selected picture type, wherein the reference set comprises a set of historical images of the person, wherein the set of historical images of the person includes at least one or more previously captured images of the selected picture type that are obtained by the mining, wherein the comparing includes comparing the live image capture of the person with the set of historical images of the person;

determining, by the processor, based on the comparison, when the live image capture matches with the reference set, wherein the matching is based at least in part on one or more of the stored height, distance, or angle of the image capture device;

upon determining that the live image capture does not match the reference set, providing feedback instructions regarding an adjustment to be made to improve matching between the live image capture and the reference set, wherein the live image capture is not stored by the processor, wherein providing feedback instructions includes issuing control commands by the processor upon determining that the live image capture does not match the reference set, wherein the control commands when executed by the autonomous vehicle cause the autonomous vehicle to move to a new position relative to the person based on the adjustment; and upon determining that the live image capture matches the reference set, capturing a current image by the image sensor and storing the captured current image by the processor.

8. The system of claim 7, wherein the feedback instructions include at least one of visual instructions or audible instructions.

9. The system of claim 7, wherein the reference set further comprises a generic set of images of the selected picture type.

10. The system of claim 7, wherein the live image capture includes at least one of a plurality of captured still images or a live image feed obtained through the image sensor.

11. The system of claim 7, wherein determining a match between the live image capture and the reference set comprises determining if a threshold is met or exceeded when the comparison is made.

12. The system of claim 7, the processor further configured to determine a plurality of people are present in the live capture, wherein each of the plurality of people is identified in the live image capture, wherein a reference set for each person is compared, and the feedback instructions include instructions associated with each of the plurality of people.

13. A computer program product to obtain desired self-pictures via a system comprising a processor, memory, and an autonomous vehicle that includes an image capture device having at least one image sensor, the computer program product comprising a computer readable storage medium having program instructions embodied therewith, the program instructions executable by a processor to cause the processor to:
  receive, by the processor, an input regarding a selected picture type to be captured, wherein the picture type is selected from a plurality of preset picture types, wherein the plurality of preset picture types includes at least one of a happy picture type, a surprised picture type, or a funny picture type;
  receive, by the image sensor, live image capture, wherein the image capture device is configured to monitor and store a height, distance, and angle of the image capture device at a time when the image capture device is capturing the live image capture;
  identify, by the processor, a person in the live image capture;
  mine, by the processor, images of the person from one or more social networks based on social network criteria;
  compare, by the processor, the live image capture of the person with a reference set based on the selected picture type, wherein the reference set comprises a set of historical images of the person, wherein the set of historical images of the person includes at least one or more previously captured images of the selected picture type that are obtained by the mining, wherein the comparing includes comparing the live image capture of the person with the set of historical images of the person;
  determine, based on the comparison, when the live image capture matches with the reference set, wherein the matching is based at least in part on one or more of the stored height, distance, or angle of the image capture device;
  upon determining that the live image capture does not match the reference set, provide feedback instructions regarding an adjustment to be made to improve matching between the live image capture and the reference set, wherein the live image capture is not stored by the processor, wherein providing feedback instructions includes issuing control commands by the processor upon determining that the live image capture does not match the reference set, wherein the control commands when executed by the autonomous vehicle cause the autonomous vehicle to move to a new position relative to the person based on the adjustment; and
  upon determining that the live image capture does not match the reference set, capture a current image by the image sensor and store the captured current image by the processor.

14. The computer program product of claim 13, wherein the feedback instructions include at least one of visual instructions or audible instructions.

15. The computer program product of claim 13, wherein the reference set is based on historical images of the person.

* * * * *